United States Patent
Song et al.

(10) Patent No.: US 11,404,689 B2
(45) Date of Patent: Aug. 2, 2022

(54) POSITIVE ELECTRODE AND LITHIUM SECONDARY BATTERY INCLUDING THE SAME

(71) Applicant: LG Chem, Ltd., Seoul (KR)

(72) Inventors: Jooyong Song, Daejeon (KR); In Chui Kim, Daejeon (KR); Juri Kim, Daejeon (KR); Hyun Min Kim, Daejeon (KR)

(73) Assignee: LG Energy Solution, Ltd.

( * ) Notice: Subject to any disclaimer, the term of this patent is extended or adjusted under 35 U.S.C. 154(b) by 277 days.

(21) Appl. No.: 16/607,297

(22) PCT Filed: Nov. 27, 2018

(86) PCT No.: PCT/KR2018/014722
§ 371 (c)(1),
(2) Date: Oct. 22, 2019

(87) PCT Pub. No.: WO2019/103573
PCT Pub. Date: May 31, 2019

(65) Prior Publication Data
US 2020/0052291 A1    Feb. 13, 2020

(30) Foreign Application Priority Data

Nov. 27, 2017 (KR) .................. 10-2017-0159734
Nov. 27, 2018 (KR) .................. 10-2018-0148008

(51) Int. Cl.
| | | |
|---|---|---|
| *H01M 4/36* | (2006.01) | |
| *H01M 4/62* | (2006.01) | |
| *H01M 4/505* | (2010.01) | |
| *H01M 4/525* | (2010.01) | |
| *H01M 4/04* | (2006.01) | |
| *H01M 4/1391* | (2010.01) | |
| *H01M 4/131* | (2010.01) | |
| *H01M 10/0525* | (2010.01) | |
| *H01M 4/02* | (2006.01) | |

(52) U.S. Cl.
CPC ......... *H01M 4/366* (2013.01); *H01M 4/0404* (2013.01); *H01M 4/131* (2013.01); *H01M 4/1391* (2013.01); *H01M 4/505* (2013.01); *H01M 4/525* (2013.01); *H01M 4/625* (2013.01); *H01M 10/0525* (2013.01); *H01M 2004/028* (2013.01)

(58) Field of Classification Search
CPC ....... H01M 10/0525; H01M 2004/028; H01M 4/0404; H01M 4/131; H01M 4/1391; H01M 4/366; H01M 4/505; H01M 4/525; H01M 4/62; H01M 4/625; H01M 4/92
See application file for complete search history.

(56) References Cited

U.S. PATENT DOCUMENTS

| | | |
|---|---|---|
| 2013/0089796 A1 | 4/2013 | Sun et al. |
| 2015/0188121 A1 | 7/2015 | Lee et al. |
| 2015/0364795 A1 | 12/2015 | Stefan et al. |
| 2016/0261013 A1 | 9/2016 | Hase et al. |
| 2016/0329603 A1 | 11/2016 | Labyedh et al. |
| 2017/0018767 A1 | 1/2017 | Park et al. |
| 2017/0194625 A1 | 7/2017 | Woehrle et al. |
| 2017/0309914 A1 | 10/2017 | Drews et al. |

FOREIGN PATENT DOCUMENTS

| | | |
|---|---|---|
| CN | 104321908 A | 1/2015 |
| JP | 2004087251 A | 3/2004 |
| JP | 2010225291 A | 10/2010 |
| JP | 2011108505 A | 6/2011 |
| JP | 5541502 B2 | 7/2014 |
| JP | 2016162686 A | 9/2016 |
| JP | 2016225114 A | 12/2016 |
| JP | 2017022085 A | 1/2017 |
| KR | 20110119575 A | 11/2011 |
| KR | 20160128014 A | 11/2016 |
| KR | 20170008164 A | 1/2017 |
| WO | 0139302 A1 | 5/2001 |

OTHER PUBLICATIONS

Search report from International Application No. PCT/KR2018/014722, dated Mar. 5, 2019.
Bie, Yitian, et al., "Li2O2 as a cathode additive for the initial anode irreversibility compensation in lithium-ion batteries." Chem. Common., Received Jun. 15, 2017; Accepted Jun. 30, 2017, vol. 53, pp. 8324-8327.
Extended European Search Report including Written Opinion for Application No. EP18881270.5, dated Jun. 30, 2020, pp. 1-9.
Search Report dated Feb. 16, 2022 from the Office Action for Chinese Application No. 201880019051.5 dated Feb. 22, 2022, 3 pages.

*Primary Examiner* — Carlos Barcena
(74) *Attorney, Agent, or Firm* — Lerner, David, Littenberg, Krumholz & Mentlik, LLP

(57) ABSTRACT

A positive electrode, and a lithium secondary battery including the positive electrode, are provided. Specifically, the positive electrode may effectively counterbalance an irreversible capacity imbalance between two electrodes and further increase the initial charge capacity of the positive electrode by double-coating a positive electrode collector with a positive electrode active material and a lithium oxide-based compound.

8 Claims, 2 Drawing Sheets

[FIG. 1]
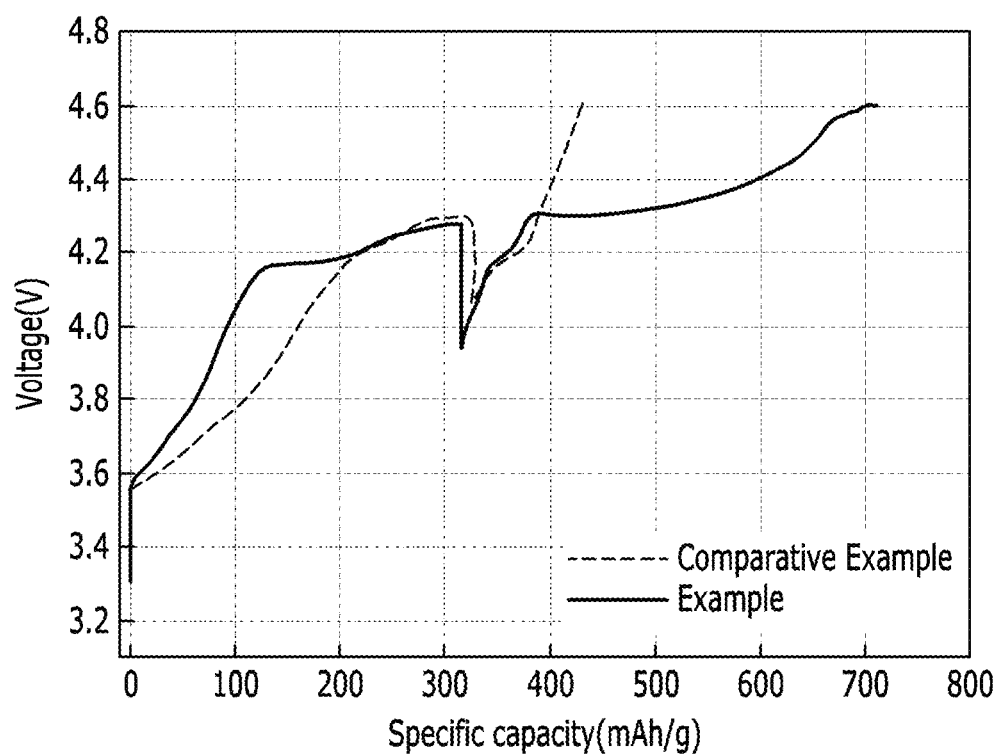

[Figure 2]
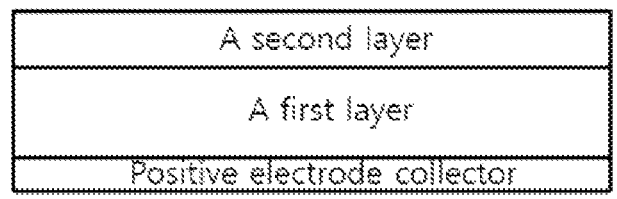

POSITIVE ELECTRODE AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/014722 filed Nov. 27, 2018, the disclosure of which is incorporated herein in its entirety by reference, which is based on, and claims priority from, Korean Patent Application Nos. 10-2017-0159734 and 10-2018-0148008, filed on Nov. 27, 2017 and Nov. 27, 2018, respectively, the disclosures of which are hereby incorporated by reference herein in their entirety. [TECHNICAL FIELD] The present invention relates to a positive electrode and a lithium secondary battery including the same.

BACKGROUND ART

A lithium secondary battery creates electrical energy via oxidation/reduction reactions of electrodes by employing electrode active materials capable of reversible intercalation/deintercalation of lithium ions as a negative electrode and a positive electrode, and by allowing movement of lithium ions via an electrolyte.

However, during initial charge/discharge ($1^{ST}$ cycle charge-discharge) of a lithium secondary battery, lithium ions which are deintercalated (battery discharge) after being intercalated (battery charge) into a negative electrode and lithium ions which are not reintercalated (battery discharge) after being deintercalated (battery charge) from a positive electrode are inevitably generated, respectively. This is associated with irreversible capacities of both electrodes.

When a difference between the irreversible capacities of both electrodes is larger, the initial efficiency of the positive electrode may be decreased, and the energy density during operation of the battery may be gradually decreased, leading to reduction in lifetime of the battery.

DISCLOSURE

Technical Problem

One embodiment of the present invention provides a positive electrode capable of effectively counterbalancing an irreversible capacity imbalance between two electrodes and further increasing the initial charge capacity of the positive electrode by double-coating a positive electrode collector with a positive electrode active material and a lithium oxide-based compound.

Technical Solution

Specifically, a positive electrode of one embodiment may include: a positive electrode collector; a first layer which is disposed on the positive electrode collector and includes a positive electrode active material; and a second layer which is disposed on the first layer and includes a lithium oxide-based compound represented by the following Chemical Formula 1, wherein the positive electrode may be applied to a lithium secondary battery:

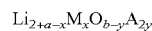  [Chemical Formula 1]

wherein, in Chemical Formula 1, M is one or more of alkali metal elements, and A is one or more of halogen atoms, −0.005≤a≤0.005, 0≤x≤0.01, 0.995≤b≤2.005, and 0≤y≤0.005. One example of such a positive electrode including a first layer and a second layer is illustrated in FIG. 2.

Effect of the Invention

In a lithium secondary battery to which a positive electrode of one embodiment is applied, an irreversible capacity imbalance between two electrodes may be effectively counterbalanced, the initial charge capacity of the positive electrode may be increased, and loss of energy density during operation of the battery may be decreased, leading to excellent lifetime characteristics.

BRIEF DESCRIPTION OF DRAWING

FIG. 1 shows evaluation of initial charge/discharge characteristics of batteries of an examples and a comparative example.

FIG. 2 shows one embodiment of a positive electrode including a first layer and a second layer.

DETAILED DESCRIPTION OF THE EMBODIMENTS

Advantages and features of embodiments of the present invention and methods for achieving them will be made clear from embodiments described below in detail. The present invention may, however, be embodied in many different forms, and should not be construed as being limited to the embodiments set forth herein. Rather, these embodiments are provided so that this disclosure will be thorough and complete, and will fully convey the scope of the invention to those skilled in the art to which the present invention pertains. The present invention is merely defined by the scope of the claims.

Unless otherwise defined, technical and scientific terms used herein have the same meaning as commonly understood by those skilled in the art to which this invention pertains. Additionally, repeated explanations of the technical constitutions and actions equivalent to those of the conventional ones will be omitted.

Throughout the specification, when an element is referred to as being "connected" to another element, the element is "directly connected" to the other element or "electrically connected" to the other element with one or more intervening elements interposed therebetween.

Throughout the specification, when one member is referred to as being "on" another member, one member may be adjacent to another member or intervening members may exist therebetween.

Throughout the specification, when an element "includes" other elements, it means that other elements may be further included rather than other elements being excluded, unless content to the contrary is specially described.

Throughout the specification, the term "about" or "substantially" is intended to have a meaning of close to numerical values or ranges specified with an allowable error, and is intended to prevent accurate or absolute numerical values disclosed for understanding of the present disclosure from being illegally or unfairly used by any unconscionable third party.

Throughout the specification, the term "step of" does not mean "step for".

Throughout the specification, the term "combination(s) of" included in a Markush type of description means a mixture or a combination of one or more components selected from a group consisting of components described in the Markush type, and means that the disclosure includes one or more selected from the group consisting of the components.

Throughout the specification, a phrase in the form "A and/or B" means "A or B", or "A and B".

Positive Electrode One embodiment provides a positive electrode including a positive electrode collector; a first layer which is disposed on the positive electrode collector and includes a positive electrode active material, a conductive material, and a binder; and a second layer which is disposed on the first layer and includes a lithium oxide-based compound represented by the following Chemical Formula 1:

$$Li_{2+a-x}M_xO_{b-y}A_{2y}$$ [Chemical Formula 1]

wherein, in Chemical Formula 1, M is one or more of alkali metal elements, A is one or more of halogen atoms, $-0.005 \leq a \leq 0.005$, $0 \leq x \leq 0.01$, $0.995 \leq b \leq 2.005$, and $0 \leq y \leq 0.005$.

In the positive electrode of one embodiment, 1) the lithium oxide-based compound represented by Chemical Formula 1 may compensate for irreversible additive capacity of a negative electrode, and 2) the positive electrode collector may be double-coated with the positive electrode active material and the lithium oxide-based compound represented by Chemical Formula 1, and thus blending of them may solve problems of single layer coating.

Specifically, in the positive electrode of one embodiment, the lithium oxide-based compound represented by Chemical Formula 1 is a material capable of counterbalancing an irreversible capacity imbalance between two electrodes and increasing the initial efficiency of the positive electrode.

For example, lithium peroxide ($Li_2O_2$) may irreversibly release lithium ions and oxygen. The reaction is an oxygen evolution reaction (OER) of the following Reaction Scheme 1, whereby 1 mole of oxygen and 2 moles of lithium ions may be irreversibly released from 1 mole of lithium peroxide ($Li_2O_2$).

$$Li_2O_2 \rightarrow 2Li^+ + O_2$$ [Reaction Scheme 1]

Herein, lithium peroxide ($Li_2O_2$) is exemplified, but the lithium oxide-based compound represented by Chemical Formula 1 may be a compound including a large amount of lithium, as compared with a common positive electrode active material including about 1 mole of lithium, thereby releasing a large amount of lithium, as in Reaction Scheme 1.

Therefore, when the lithium oxide-based compound is applied to the positive electrode, irreversible capacity of the negative electrode may be reduced during initial charge/discharge of a battery, thereby counterbalancing an irreversible capacity imbalance between the negative electrode and the positive electrode and increasing initial efficiency of the positive electrode.

In the positive electrode of one embodiment, the lithium oxide-based compound may be applied independently of the positive electrode active material, such that the positive electrode active material and the lithium oxide-based compound are separate layers. This configuration of layers is as opposed to applying both materials in a blended state, that is, as a single combined layer.

When the lithium oxide-based compound is blended with the positive electrode active material, and the blend is applied onto the positive electrode collector, the following problems may be generated.

i) During initial charge of a battery, oxygen ($O_2$) gas generated from the lithium oxide-based compound may produce pores in the coating layer (single layer). Due to the pores thus produced in the coating layer (single layer), ii) the positive electrode density after initial charge of the battery and the entire energy density of the battery may be reduced.

Accordingly, in one embodiment, the positive electrode collector is double-coated with first the positive electrode active material and then the lithium oxide-based compound, thereby solving the problems of the blended single coating layer which is formed by blending the lithium oxide-based compound with the positive electrode active material prior to applying the materials to the positive electrode collector.

Specifically, in the positive electrode of one embodiment, a reduction decomposition reaction of the lithium oxide-based compound may occur on the surface where the second layer contacts an electrolyte, and thus the reaction is terminated by disappearance of the second layer i) without affecting the first layer (that is, without forming pores inside the first layer). Therefore, ii) loss of the electrode density of the first layer and iii) reduction of the entire energy density of the battery may not occur or may be very low.

Consequently, in the lithium secondary battery to which the positive electrode of one embodiment is applied, the irreversible capacity imbalance between the two electrodes may be effectively counterbalanced, the initial charge capacity of the positive electrode may be increased, and loss of the energy density of the positive electrode may be decreased, leading to excellent lifetime characteristics.

Hereinafter, components of the positive electrode of one embodiment will be described in more detail.

Second Layer

The lithium oxide-based compound included in the second layer is not particularly limited, as long as it is a material which may be represented by Chemical Formula 1 and may release lithium ions, as in Reaction Scheme 1. For example, the lithium oxide-based compound may be lithium peroxide ($Li_2O_2$) as in Reaction Scheme 1, lithium oxide ($Li_2O$), or a mixture thereof.

Meanwhile, the second layer may include platinum (Pt) in addition to the lithium oxide-based compound. The platinum (Pt) serves as a catalyst in the oxygen evolution reaction (OER) of Reaction Scheme 1 proceeded by the lithium oxide-based compound to contribute to improvement of the reaction efficiency of Reaction Scheme 1. For example, the content of the platinum in the second layer may satisfy 1% by weight to 5% by weight with respect to the total 100% by weight of the second layer. In this range, the functions of the platinum as a catalyst may be effectively exhibited, but the present invention is not limited thereto.

Further, the second layer may include materials generally applied to a positive electrode mix layer in the art, for example, a conductive material, a binder, or a mixture thereof. Specific kinds of the conductive material and the binder will be described below.

First Layer

Independently of the second layer, the first layer may further include materials generally applied to a positive electrode mix layer in the art, for example, a conductive material, a binder, or a mixture thereof. Specific kinds of the conductive material and the binder will be described below.

Conductive Material

In the first layer and the second layer, the kind of the conductive material is not particularly limited. For example, the conductive material is used to form an electron conductive network in the first layer, and is not particularly limited, as long as it has electrical conductivity without causing chemical changes in the battery. Examples thereof may include natural graphite, artificial graphite, carbon black, acetylene black, Ketjen black, carbon fibers, metallic powders, or metallic fibers of copper, nickel, aluminum, silver, etc., and conductive materials such as polyphenylene derivatives, etc. may be used alone or in a mixture of one or more thereof.

Regardless of the kind thereof, the conductive material may be used in an amount of 0.1% by weight to 10% by weight, for example, 0.5% by weight to 10% by weight, or 5% by weight to 10% by weight, with respect to the total weight (100% by weight) of each of the first layer and the second layer. When satisfying the above range, the conductivity of the first layer and the second layer may be improved, but it is not limited thereto.

Positive Electrode Active Material

Further, in the first layer, the kind of the positive electrode active material is not particularly limited, as long as it includes one or more of composite oxides of cobalt, manganese, nickel, or a combination thereof and lithium, and is capable of reversible intercalation/deintercalation of lithium ions. For example, the positive electrode active material may include one or more of composite oxides of cobalt, manganese, nickel, or a combination thereof and lithium.

More specifically, as the positive electrode active material, a compound represented by any one of the following Chemical Formulae may be used: $Li_aA_{1-b}R_bD_2$ (wherein $0.90 \leq a \leq 1.8$ and $0 \leq b \leq 0.5$); $Li_aE_{1-b}R_bO_{2-c}D_e$ (wherein $0.90 \leq a \leq 1.8$, $0 \leq b \leq 0.5$, and $0 \leq c \leq 0.05$); $LiE_{2-b}R_bO_{4-c}D$ (wherein $0 \leq b \leq 0.5$ and $0 \leq c \leq 0.05$); $Li_aNi_{1-b-c}Co_bR_cD_\alpha$, (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bR_cO_{2-\alpha}Z_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bR_cO_{2-\alpha}Z_2$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bR_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bR_cO_{2-\alpha}Z_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bR_cO_{2-\alpha}Z_2$ (wherein $0.90 \leq a \leq 1.8$, $0 \leq b \leq 0.5$, $0 \leq c \leq 0.05$, and $0 \leq \alpha \leq 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the above Chemical Formulae, A is Ni, Co, Mn, or a combination thereof; R is Al, Ni, Co, Mn, Cr, Fe, Mg, Sr, V, a rare-earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

A compound having a coating layer on the surface of the above compound may be used, or a mixture of the above compound and the compound having a coating layer may be used. The coating layer may include an oxide or hydroxide of a coating element, an oxyhydroxide of a coating element, an oxycarbonate of a coating element, or a hydroxycarbonate of a coating element as a coating element compound. The compounds constituting these coating layers may be non-crystalline or crystalline. The coating element included in the coating layer may be Mg, Al, Co, K, Na, Ca, Si, Ti, V, Sn, Ge, Ga, B, As, Zr, or a mixture thereof. A process of forming the coating layer may be any coating method, as long as the method (e.g., a spray coating method, an immersion method, etc.) does not adversely affect physical properties of the positive electrode active material even when the above elements are used in the compound. Since the explanation thereof may be understood by those skilled in the art, it will be omitted.

Regardless of the kind thereof, the positive electrode active material may be used in an amount of 1% by weight to 99% by weight, 1% by weight to 80% by weight, for example, 1% by weight to 70% by weight with respect to the total weight (100% by weight) of the first layer. When satisfying the above range, the energy density by the positive electrode active material may be secured, but is not limited thereto.

Binder

In the first layer and the second layer, the binder functions to improve adhesion between the positive electrode active material particles, and adhesion of the positive electrode active material to a current collector. Representative examples thereof may include polyvinyl alcohol, carboxymethyl cellulose, hydroxypropyl cellulose, diacetyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, etc., but are not limited thereto.

Method of Preparing Positive Electrode

The positive electrode of one embodiment may be fabricated using a method generally known in the art. For example, a mixture including the positive electrode active material, the conductive material, and/or the binder is applied onto a positive electrode collector, and then dried to form the first layer. The lithium oxide-based compound alone, or a mixture of the lithium oxide-based compound and platinum (and/or other materials generally applied to a positive electrode mix layer in the art), is applied onto the first layer and then dried to form the second layer, thereby obtaining the positive electrode of one embodiment.

The positive electrode collector may be fabricated in a thickness of 3 μm to 500 μm. The positive electrode collector is not particularly limited as long as it has high conductivity without causing chemical changes in a battery. For example, stainless steel, aluminum, nickel, titanium, calcined carbon, and aluminum or stainless steel that is surface-treated with carbon, nickel, titanium, or silver may be used. Adhesion of the positive electrode active material may be increased by forming fine roughness on the surface of the collector, and the collector may be in a variety of forms such as a film, a sheet, a foil, a net, a porous material, a foamed material, a non-woven fabric material, etc.

The conductive material is used to form an electron conductive network in the first layer, and is not particularly limited as long as it has electrical conductivity without causing chemical changes in the battery. Examples thereof may include natural graphite, artificial graphite, carbon black, acetylene black, Ketjen black, carbon fibers, and metallic powders or metallic fiber of copper, nickel, aluminum, silver, etc., and conductive materials such as polyphenylene derivatives, etc. may be used alone or in a mixture of one or more thereof. The conductive material may be commonly added in an amount of 1% by weight to 50% by weight, 1% by weight to 30% by weight, for example, 1% by weight to 20% by weight, with respect to the total weight (100% by weight) of the first layer. Meanwhile, graphite-based materials having an elastic property may be used as the conductive material, and may also be used along with the above materials.

The binder assists in improving adhesion between the positive electrode active material and the conductive material, and adhesion of the active material to the collector. The binder may be generally added in an amount of 1 to 50% by weight, 1 to 30% by weight, for example, 1 to 20% by weight, with respect to the total weight (100% by weight) of the first layer. Examples of the binder may include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, an ethylene-propylene-diene polymer (EPDM), sulfonated-EPDM, styrene butadiene rubber, fluorine rubber, or various copolymers.

If necessary, a filler is further added to the mixture to form the first layer. The filler is a component that is optionally used to inhibit expansion of the positive electrode. The filler is not particularly limited, as long as it is a fibrous material without causing chemical changes in the battery. For example, olefinic polymers such as polyethylene, polypropylene, etc., and fibrous materials such as glass fibers, carbon fibers, etc., may be used.

Lithium Secondary Battery

Another embodiment of the present invention provides a lithium secondary battery including the above-described positive electrode.

In the lithium secondary battery of one embodiment, the above-described positive electrode is applied, and thus initial irreversible capacity of the negative electrode may be reduced, initial efficiency of the positive electrode may be increased, and reduction of energy density during operation may be inhibited to exhibit excellent lifetime characteristics.

The lithium secondary battery of another embodiment may be fabricated according to those generally known in the art, except for the above-described positive electrode.

Hereinafter, those generally known in the art will be simply suggested, but these are for illustrative purposes only, and the present invention is not limited thereto.

The negative electrode may include a collector and a negative electrode active material layer formed on the collector, wherein the negative electrode active material layer may include a negative electrode active material.

The negative electrode active material may be one or more negative electrode active materials selected from the group consisting of carbon-based negative electrode active materials, a lithium metal, alloys of a lithium metal, Si, $SiO_x$ ($0<x<2$), a Si—C composite, a Si-Q alloy (wherein Q is an alkali metal, an alkaline earth metal, an element of Group 13 to Group 16, a transition metal, a rare earth element, or a combination thereof, excluding Si), Sn, $SnO_2$, a Sn—C composite, and Sn—R (wherein R is an alkali metal, an alkaline earth metal, an element of Group 13 to Group 16, a transition metal, a rare earth element, or a combination thereof, excluding Sn).

The negative electrode collector may be commonly fabricated in a thickness of 3 μm to 500 μm. The negative electrode collector is not particularly limited as long as it has conductivity without causing chemical changes in the battery. For example, copper, stainless steel, aluminum, nickel, titanium, calcined carbon, or copper or stainless steel that is surface-treated with carbon, nickel, titanium, or silver, or an aluminum-cadmium alloy, may be used. Also, like the positive electrode collector, adhesion of the negative electrode active material may be increased by forming fine roughness on the surface of the collector. The collector may be in a variety of forms such as a film, a sheet, a foil, a net, a porous material, a foamed material, a non-woven fabric material, etc.

The lithium secondary battery of another embodiment may be a lithium ion battery, a lithium ion polymer battery, or a lithium polymer battery according to the kind of electrolyte and/or the kind of separator.

When the lithium secondary battery of another embodiment is a lithium ion battery to which a liquid electrolyte is applied, the liquid electrolyte may be applied after immersing a separator therein. The separator is interposed between the positive electrode and the negative electrode. As the separator, an insulating thin film having high ion permeability and mechanical strength is used. The separator generally has a pore diameter of 0.01 μm to 10 μm and a thickness of 5 μm to 300 μm. As the separator, for example, a sheet or non-woven fabric made of an olefin polymer, such as polypropylene having chemical resistance and hydrophobicity, etc.; glass fiber; or polyethylene is used. When a solid electrolyte such as a polymer is employed as the electrolyte, the solid electrolyte may serve as both the separator and the electrolyte.

The liquid electrolyte may be a non-aqueous electrolyte containing lithium salts. The non-aqueous electrolyte containing lithium salts is composed of a non-aqueous electrolyte and lithium. A non-aqueous organic solvent, an organic solid electrolyte, or an inorganic solid electrolyte may be used as the non-aqueous electrolyte. However, the non-aqueous electrolyte is not limited thereto.

The non-aqueous organic solvent may be, for example, a non-protic organic solvent such as N-methyl-2-pyrrolidone, propylene carbonate, ethylene carbonate, butylene carbonate, dimethyl carbonate, diethyl carbonate, gamma butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

The organic solid electrolyte may include, for example, polyethylene derivatives, polyethylene oxide derivatives, polypropylene oxide derivatives, a phosphoric acid ester polymer, polyagitation lysine, polyester sulfide, polyvinyl alcohol, polyvinylidene fluoride, a polymer containing ionic dissociation groups, etc.

The inorganic solid electrolyte may include, for example, Li-based nitrides, halides, or sulfates such $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, etc.

The lithium salts are readily dissolved in the non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroboran lithium, lower aliphatic carboxylic acid lithium, lithium tetraphenyl borate, imides, etc.

In order to improve charge/discharge characteristics and flame retardancy in the lithium salt-containing non-aqueous electrolyte, for example, pyridine, triethyl phosphite, triethanolamine, cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkylether, ammonium salts, pyrrole, 2-methoxy ethanol, aluminum trichloride, etc. may be added. Optionally, halogen-containing solvents such as carbon tetrachloride or ethylene trifluoride may be further added in order to provide flame resistance, or carbon dioxide gas may be further added in order to enhance high-temperature retention properties, and FEC (fluoro-ethylene carbonate), PRS (propene sultone), etc. may be further added.

In a specific embodiment, lithium salts such as $LiPF_6$, $LiClO_4$, $LiBF_4$, $LiN(SO_2CF_3)_2$, etc. may be added to a mixed solvent of a cyclic carbonate of EC or PC, which is a highly dielectric solvent, and a linear carbonate of DEC, DMC, or EMC, which is a low viscosity solvent, thereby preparing the lithium salt-containing non-aqueous electrolyte.

The lithium secondary battery of another embodiment may be embodied into a battery module including the lithium secondary battery as a unit cell, a battery pack including the battery module, and a device including the battery pack as a power source.

In this regard, specific examples of the device may include electric vehicles, hybrid electric vehicles, plug-in hybrid electric vehicles, electric storage systems, etc., but are not limited thereto.

Hereinafter, examples of the present disclosure will be described in detail in such a manner that it may easily be implemented by those skilled in the art to which the present disclosure pertains. However, the present disclosure may be implemented in various different forms and is not limited to the embodiments described herein.

Example 1: Fabrication of Positive Electrode

A positive electrode active material $(LiNi_{0.8}Co_{0.1}Mn_{0.1}O_2)$:conductive material (carbon black, commercial name: Super C65, Timcal Ltd.):binder (PVDF, commercial name KF1100, Kureha Corp.)=88.0:5.0:7.0 were blended at this weight ratio, ground using a mortar, and dry-mixed to prepare a positive electrode mix of Example 1.

An organic solvent (NMP) was added to the positive electrode mix of Example 1 to prepare a slurry phase, which was then applied onto an aluminum collector, and vacuum-dried in a vacuum oven at 120° C. for 12 hours.

Thereafter, lithium peroxide $(Li_2O_2)$:platinum (Pt):conductive material (carbon black, commercial name Super C65, Timcal Ltd.):binder (PVDF, commercial name KF1100, Kureha Corp.)=75.5:1.9:5.7:17.0 were blended at this weight ratio, ground using a mortar, dry-mixed, and applied onto the dried positive electrode mix layer, and vacuum-dried in a vacuum oven at 120° C. for 12 hours.

As a result, a positive electrode of Example 1 was obtained.

Example 2: Fabrication of Lithium Secondary Battery

Graphite:conductive material (carbon black, commercial name: Super C65, Timcal Ltd.):binder (SBR, commercial name: A544, ZEON Corp.):thickener (CMC. Daicell 2200, Daicell Corp.)=94.2:2:2.5:1.3 were blended at this weight ratio and dry-mixed to prepare a negative electrode mix.

An organic solvent (NMP) was added to the negative electrode mix to prepare a slurry phase, which was then applied onto a copper collector, and vacuum-dried in a vacuum oven at 120° C. for 12 hours to obtain a negative electrode.

A separator having a thickness of 9 μm and porosity of 42 vol and being made of PP/PE was interposed between the prepared negative electrode and the positive electrode of Example 1 in a battery container, and an electrolyte was injected thereto to fabricate a 2032 full cell-type lithium secondary battery according to a common fabrication method.

As the electrolyte, 1 M $(LiPF_6)$ dissolved in a mixed solvent of EC:DMC:DEC at a volume ratio of 1:2:1 (1M $LiPF_6$ in EC:DMC:DEC=1:2:1 (v:v:v)) was used.

Comparative Example 1: Fabrication of Positive Electrode

A positive electrode active material $(LiNi_{0.8}Co_{0.1}Mn_{0.1}O_2)$ and lithium peroxide $(Li_2O_2)$:conductive material (carbon black, commercial name: Super C65, Timcal Ltd.):binder (PVDF, commercial name KF1100, Kureha Corp.)=85:1:8:6 were blended at this weight ratio, while satisfying the positive electrode active material $(LiNi_{0.8}Co_{0.1}Mn_{0.1}O_2)$ and the lithium peroxide $(Li_2O_2)$ at a weight ratio of 80:20, ground using a mortar, and dry-mixed to prepare a positive electrode mix of Comparative Example 1.

An organic solvent (NMP) was added to the positive electrode mix of Comparative Example 1 to prepare a slurry phase, which was then applied onto an aluminum collector, and vacuum-dried in a vacuum oven at 120° C. for 12 hours. As a result, a positive electrode of Comparative Example 1 was obtained.

Comparative Example 2: Fabrication of Lithium Secondary Battery

A lithium secondary battery of Comparative Example 2 was fabricated in the same manner as in Example 1, except that the positive electrode of Comparative Example 1 was used instead of the positive electrode of Example 1.

Experimental Example 1: Evaluation of Initial Charge/Discharge Characteristics of Battery I For each of the batteries of the examples and comparative examples, initial charge/discharge characteristics were evaluated at room temperature under the following conditions. The evaluation results are recorded in FIG. 1.

Charge: 0.01C, CC/CV, 4.6V, 5% cut-off
Discharge: 0.01C, CC, 2.5 V, cut-off

In the examples and comparative examples, lithium peroxide $(Li_2O_2)$ was commonly applied to the positive electrode to compensate for the irreversible additive capacity of the negative electrode.

As described above, the lithium peroxide $(Li_2O_2)$ is a compound capable of theoretically releasing irreversibly 1 mole of oxygen and 2 moles of lithium ions per 1 mole thereof according to the following Reaction Scheme 1.

$$Li_2O_2 \rightarrow 2Li^+ + O_2 \qquad \text{[Reaction Scheme 1]}$$

However, according to FIG. 1, in the high voltage region of 4.3 V or more, the battery of the example in which lithium peroxide $(Li_2O_2)$ was coated on the positive electrode mix layer (i.e., first layer) showed high positive electrode charge capacity, as compared with that of the comparative example in which blending of the lithium peroxide $(Li_2O_2)$ and the positive electrode active material was applied.

In the example, a reduction decomposition reaction of the lithium peroxide $(Li_2O_2)$ occurs on the surface where the lithium peroxide $(Li_2O_2)$ layer (i.e., second layer) contacts an electrolyte, and thus the reaction is terminated by disappearance of the second layer i) without affecting the first layer (that is, without forming pores inside the first layer).

Therefore, ii) loss of the electrode density of the first layer and iii) reduction of the entire energy density of the battery may not occur or may be very low.

Consequently, the example showed that irreversible capacity imbalance between two electrodes may be effectively counterbalanced, the initial charge capacity of the positive electrode may be increased, and loss of the energy density of the positive electrode may be decreased, leading to excellent lifetime characteristics, as compared with the comparative example.

The invention claimed is:

1. A positive electrode comprising:
a positive electrode collector;
a first layer which is disposed on the positive electrode collector and includes a positive electrode active material; and
a second layer which is disposed on the first layer and includes lithium peroxide ($Li_2O_2$), lithium oxide ($Li_2O$), or a mixture thereof,
wherein the second layer further includes platinum (Pt), a conductive material, a binder, or a mixture thereof, and
wherein a content of the platinum in the second layer is 1% by weight to 5% by weight with respect to the total 100% by weight of the second layer.

2. The positive electrode of claim 1, wherein the first layer further includes a conductive material, a binder, or a mixture thereof.

3. The positive electrode of claim 1, wherein a content of the conductive material in the second layer is 5% by weight to 10% by weight with respect to the total 100% by weight of the second layer.

4. The positive electrode of claim 1, wherein the conductive material includes one or more selected from the group consisting of natural graphite, artificial graphite, carbon black, acetylene black, Ketjen black, carbon fibers, metallic powders, metallic fibers, and polyphenylene derivatives.

5. The positive electrode of claim 1, wherein the positive electrode active material includes one or more of composite oxides of a metal of cobalt, manganese, nickel, or a combination thereof, and lithium.

6. A lithium secondary battery comprising the positive electrode of claim 1, a negative electrode, and an electrolyte.

7. The lithium secondary battery of claim 6, wherein the negative electrode includes one or more negative electrode active materials selected from the group consisting of carbon-based negative electrode active materials, a lithium metal, alloys of a lithium metal, Si, $SiO_x$ (0<x<2), a Si—C composite, a Si-Q alloy (wherein Q is an alkali metal, an alkaline earth metal, an element of Group 13 to Group 16, a transition metal, a rare earth element, or a combination thereof, excluding Si), Sn, $SnO_2$, a Sn—C composite, and Sn—R (wherein R is an alkali metal, an alkaline earth metal, an element of Group 13 to Group 16, a transition metal, a rare earth element, or a combination thereof, excluding Sn).

8. A method of forming the positive electrode of claim 1, comprising the steps of:
obtaining the positive current collector;
applying the positive electrode active material to the positive current collector;
drying the positive electrode active material applied to the positive current collector to form the first layer;
applying lithium peroxide ($Li_2O_2$), lithium oxide ($Li_2O$), or a mixture thereof onto the first layer; and
drying the lithium peroxide ($Li_2O_2$), lithium oxide ($Li_2O$), or a mixture thereof applied to the first layer to form the second layer.

* * * * *